June 3, 1941.  E. D. PHINNEY  2,244,632
CRACKING HYDROCARBON OILS
Filed Aug. 29, 1939
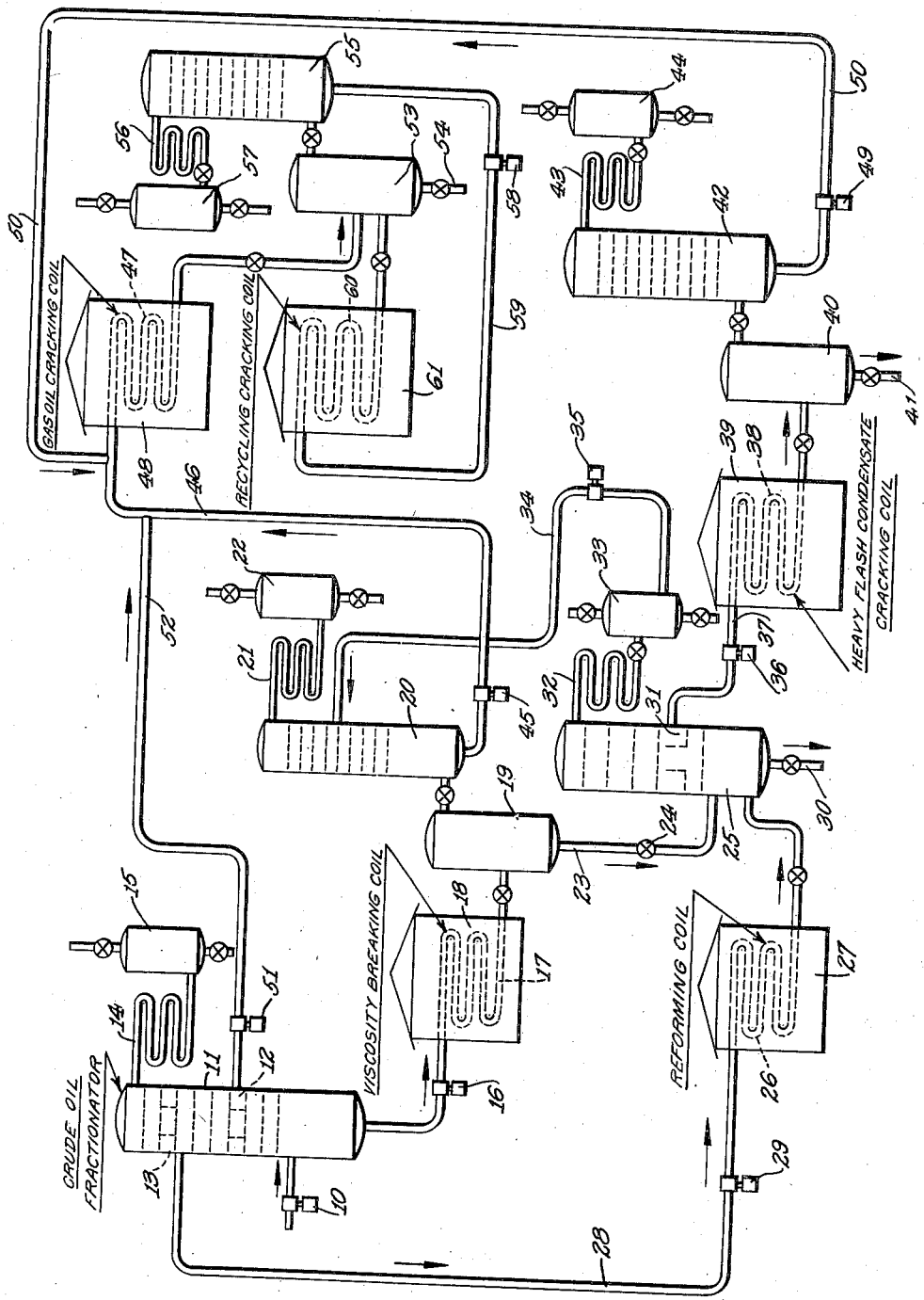
INVENTOR
EDWARD D. PHINNEY
BY
WM T Donaldson
ATTORNEY

Patented June 3, 1941

2,244,632

UNITED STATES PATENT OFFICE 2,244,632

CRACKING HYDROCARBON OILS

Edward D. Phinney, Mount Vernon, N. Y., assignor to Gasoline Products Company, Inc., Jersey City, N. J., a corporation of Delaware Application August 29, 1939, Serial No. 292,385

7 Claims. (Cl. 196—49)

This invention relates to certain novel improvements in combination cracking processes.

In order to obtain a maximum yield of gasoline or motor fuel from crude petroleum, it is necessary that adequate cracking conditions be applied to the heavier constituents thereof. In accordance with the invention, a crude residual stock such as topped or reduced crude, is subjected to a primary cracking operation under viscosity-breaking conditions to effect conversion into intermediate constituents of the nature of gas oil or kerosene, which are adapted for conversion into gasoline, the viscosity-broken products are separated into vapors and residue and the residue subjected to a flashing operation and flashed deeply in order to recover a heavy condensate, which condensate is passed to a second cracking zone for further conversion into intermediate constituents and the intermediate constituents produced in these two cracking operations are passed to a subsequent cracking zone in which they are subjected to cracking for conversion into gasoline constituents. The primary viscosity-breaking of the crude residual stock and the secondary viscosity-breaking of the heavy flashed condensate are conducted as single-pass operations. In this way a higher cracking per pass may be applied to the crude residual stock and to the heavy flashed condensate so that the gasoline produced in these operations is of higher anti-knock quality than can be obtained in recycling operations so as to thereby enhance the anti-knock value of the total gasoline product of the complete combination process.

In accordance with the invention, crude petroleum is subjected to a distilling or stripping operation to obtain a crude residuum, which is passed to the primary single-pass viscosity-breaking zone. The viscosity-broken products are separated into vapors and residue and the residue is subjected to flash distillation under reduced pressure. It is desirable, in order to distill the residue sufficiently deeply to extract therefrom the maximum amount of vaporizable constituents to apply heating to the residue being flashed and preferably also apply the partial pressure reducing effect of a gas or low boiling component. In accordance with the invention, a naphtha stock which may be obtained in the crude stripping operation is subjected to reforming and the hot reformed products are directed into the flashing zone to aid in the distillation of the viscosity-broken residue.

The vapors resulting in the flashing operation are fractionated so as to separate the lighter constituents, including the lighter gas oil constituents, from a heavy condensate. This heavy condensate is passed to the second single-pass cracking zone in which it is subjected to cracking conditions to effect an additional conversion into intermediate constituents as well as into gasoline. The cracked products produced in the latter single-pass cracking zone are separated into vapors and residue and the vapors fractionated. The vapors from the primary viscosity-breaking operation are likewise fractionated and intermediate constituents derived from the two single-pass cracking zones are combined for cracking in a separate cracking zone for conversion into gasoline of high anti-knock quality. In accordance with the invention, the crude distilling operation may be so conducted as to segregate intermediates adapted for high cracking per pass cracking and these intermediates are combined with the intermediates obtained from the two single-pass cracking or viscosity-breaking operations for cracking under high cracking per pass conditions. Intermediate constituents contained in the lighter fraction recovered from the flashed vapors may also be passed to such high cracking per pass cracking zone.

In one advantageous method of practicing the invention, the intermediate constituents, which have been referred to, may be subjected to cracking in a separate single-pass cracking zone in which maximum rates of cracking per pass may be maintained so as to thereby effect conversion into gasoline constituents of maximum anti-knock value. In this case reflux condensate recovered from the evolved vapors may be subjected to a separate cracking operation, as by being passed to a recycling cracking zone.

For the purpose of more fully disclosing the invention, reference will now be had to the accompanying drawing, which is a diagrammatic elevation illustrating apparatus adapted for the practice of the invention.

In the apparatus listed in the drawing, charging stock is introduced by pump 10 to a stripping tower 11. The charging stock may conveniently be heated by heat exchange with hot cracked products of the process or by other means to the desired distilling temperature. The charging stock is separated into vapors and residue in the tower 11, and the separated vapors are fractionated to form condensate fractions in trays 12 and 13. The overhead vapors pass to a condenser 14 and the distillate is collected in a receiving drum 15. Residue withdrawn from tower 11 is conducted by pump 16 to a single-pass heating coil 17, positioned in a furnace 18, which constitutes the primary viscosity-breaking or cracking zone of the process. The products from the cracking coil 17 pass to a separator or evaporator 19 wherein vapors separate from residue. The separated vapors pass to a fractionating tower 20 provided with conventional fractionating elements and cooling means to obtain the desired fractionation. The overhead vapors pass to a condenser 21, the distillate from which is collected in the distillate receiver or gas separator 22. The residue withdrawn from the separator 19 passes through a line 23 and pressure reducing valve 24 to a flash tower 25. A heating coil 26, positioned in a furnace 27, is provided for reforming a naphtha fraction which may be withdrawn by a line 28 from trap-out tray 13 of tower 11 and conducted by a pump 29 to the heating coil. The hot products from the heating coil 26 discharge into the flash drum 25. Residue separated out in the flash drum 25 may be withdrawn through line 30. The upper section of the tower 25 is equipped with suitable fractionating elements and cooling means to obtain the desired fractionation so that a heavy cut may be collected in a tray 31 while the overhead vapors pass to a condenser coil 32 and the distillate is collected in a distillate receiver or gas separator 33. A line 34 and pump 35 are provided for directing the lighter flashed fraction or distillate from receiver 33 into the tower 20.

The heavy fraction collected at 31 is directed by pump 36 through line 37 to a single-pass heating coil 38, positioned in a furnace 39, which constitutes the second single-pass cracking zone for conversion into intermediate constituents. The cracked products discharged from the cracking coil 38 are separated into vapors and residue in an evaporator or separator 40 which may be provided with a draw-off line 41 for withdrawing residue. The separated vapors pass to a fractionating tower 42 which is equipped with conventional fractionating elements and cooling means to effect the desired fractionation. The overhead vapors pass to a condenser 43 and the distillate is collected in a receiving drum or gas separator 44.

Reflux condensate from tower 20 is conducted by a pump 45 through a line 46 to a single-pass heating coil 47 positioned in furnace 48 adapted to supply cracking temperature to the heating coil. Reflux condensate from tower 42 is conducted by pump 49 through line 50 thence to the line 46 or to the heating coil 47. Reflux condensate from tray 12 of tower 11 is conducted by a pump 51 through line 52 thence to the transfer line 46 or to the heating coil 47. In this way, intermediate fractions from the crude stripping operation and from the two viscosity-breaking operations are combined for cracking in the coil 47. The cracked products from coil 47 pass to a separator or reaction chamber 53 wherein vapors separate from residue. The residue may be withdrawn through a line 54. The separated vapors pass to a fractionating tower 55 provided with suitable fractionating elements and cooling means to effect the desired fractionation. The overhead vapors pass to a condenser 56, the distillate from which is collected in a receiving drum or gas separator 57. Reflux condensate from tower 55 may be directed by a pump 58 through a line 59 to a heating coil 60 positioned in a furnace 61 adapted for heating the condensate to a cracking temperature. The cracked products from the heating coil 60 pass to the evaporator 53.

In practicing the invention, the crude oil charge is subjected to fractionation in the tower 11. In a preferred operation the distillation and fractionation is so conducted as to withdraw a residue from the tower 11 of approximately 650° F. to 750° F. initial boiling point and the separated vapors are fractionated to form a light gas oil fraction at 12 which may have an initial boiling point of about 400° F. to 500° F. and an endpoint of about 650° F. to 750° F., a heavy naphtha fraction at 13 having an initial boiling point of about 250° F. to 300° F. and an endpoint of about 400° F. to 450° F., while a light gasoline distillate containing constituents boiling below 250° F. to 300° F. is collected in the receiver 15. The residue is subjected to cracking in heating coil 17 at temperatures of 850° F. to 950° F. under pressures of 75 pounds to 600 pounds to effect conversion into gasoline as well as to produce a very extensive conversion into intermediate constituents of the nature of light gas oil or kerosene. The cracked products are separated into vapors and residue in the separator 19 under pressures preferably of the order of 100 pounds to 200 pounds and the resulting residue is subjected to flash distillation in the flash tower 25 at reduced pressures approximating atmospheric pressure or even under subatmospheric pressures. The naphtha fraction withdrawn from tray 13 of tower 11 is subjected to a cracking temperature above 850° F. and preferably within the range of 950° F. to 1150° F. under pressures of 200 pounds to 1000 pounds to effect reforming of the gasoline constituents and the hot products of reforming are directed into the flash drum 25 so as to heat the residue introduced from evaporator 19 as well as to reduce the partial pressure in the flash drum. In the reforming operation when reforming a fraction essentially within the boiling range of gasoline, the resultant reformed products contain a minimum of heavy constituents so that the comparatively light stream entering into the flash drum from the reforming coil is very effective in aiding the distillation so as to produce an extremely heavy residue and effect the removal, as vapors, of extremely high boiling constituents. The separated vapors are fractionated so as to take overhead and condense in the condenser 32 the lighter gas oil constituents as well as any lighter condensibles that may be present and collect in the tray 31 a higher boiling condensate containing the extremely heavy constituents which have been distilled out of the residue and which for convenience may be referred to as heavy gas oil. The endpoint of the product collected in receiver 33 will ordinarily be about 650° F. to 750° F. and the initial boiling point of the heavy fraction collected at 31 will ordinarily be about 650° F. to 750° F. and it will consist predominantly of constituents boiling in excess of 700° F. including large portions of constituents having boiling points of the order of 800° F. and higher as determined by vacuum distillation and interpolated to an atmospheric pressure basis. This heavy gas oil is subjected to single-pass cracking in the heating coil 38 under temperatures of the order of 900° F. to 1000° F. at pressures of 200 pounds to 1000 pounds to effect an extensive conversion into light gas oil components as well as into gasoline constituents. The cracked products from the cracking coil 38 are separated into vapors and residue in separator 40 and the vapors are fractionated in tower 42 so as to take overhead a desired gasoline-containing distillate and the reflux condensate is directed by pump 49 into the heating coil 47. The straight-run gas oil from tray 12 of the crude stripping tower 11 is simultaneously directed to the heating coil 47. The flashed distillate collected in 33 is simultaneously refluxed in the tower 20 so that the gas oil constituents thereof may be combined with the reflux condensate formed therein and the resulting composite reflux condensate is also directed to the heating coil 47. In this heating coil the composite mixture of intermediate constituents from the crude oil distillation, the two single-pass cracking operations and the flashing operation, is cracked in single-pass at temperatures of the order of 950° F. to 1150° F. under pressures of 200 pounds to 1000 pounds under a rate of cracking per pass, preferably in excess of 18 per cent (as measured by conversion into 400° F. endpoint gasoline) and the cracked products are separated into vapors and residue in separator 53. Reflux condensate from tower 55 is subjected to cracking in heating coil 60 at temperatures of the order of 900° F. to 1100° F. under 200 pounds to 1000 pounds pressure.

It is advantageous to maintain vapor phase cracking conditions in the cracking coil 47 and for such operation a substantially completely vaporizable stock is necessary. By maintaining suitable temperature-pressure conditions in the separators 19 and 40 only the lighter gas oil constituents, having endpoints of about 650° F. to 700° F. may be permitted to distill over into the towers 20 and 42 respectively, so that the reflux condensate collected in these towers and directed to the cracking coil 47 may be a substantially completely vaporizable stock. In another method of operation heavier constituents may be permitted to distill over into the towers 20 and 42 and side cuts of desired boiling point may be removed from these towers and directed to the cracking coil 47 while the higher boiling condensate collected in the bottom of the towers may be used for refluxing purposes such, for example, as refluxing the evaporators 19, 40 and 53.

In another method of operation contemplated by the invention, a single cracking coil is used in lieu of the two cracking coils 47 and 60 and in this method of operation the light gas oil fractions from the crude stripping operation and from towers 20 and 42 may be refluxed in the tower 55, reflux condensate from which may be subjected to recycling cracking in heating coil 60.

Pressure distillate comprising the desired gasoline or motor fuel product is collected in the distillate receiver 57. The distillates collected in receiving drums 22 and 44 may with advantage be used as a refluxing medium in the tower 55 so that all of the cracked gasoline constituents of the process may be accumulated in the drum 57.

In a specific example of the invention, the crude oil charging stock is fractionated to produce a residue of approximately 700° F. initial boiling point, a gas oil fraction of about 500° F. initial boiling point and of 650° F. endpoint and a heavy naphtha fraction of 270° F. initial boiling point and 450° F. endpoint. The residue is subjected to single-pass cracking at temperatures of 870° F. to 900° F. under 200 pounds pressure and the products separated into vapors and residue under 100 pounds pressure in the evaporator. The residue is flash-distilled at approximately atmospheric pressure with the aid of an introduced stream from the reforming coil at a temperature of 1000° F. in which coil the heavy naphtha fraction had been subjected to reforming under pressure of about 800 pounds. The flashed vapors are fractionated to form a heavy gas oil cut consisting essentially of constituents boiling in excess of 700° F. and a lighter fraction comprising constituents boiling below 700° F. The heavy gas oil is subjected to single-pass cracking at a temperature of 900° F. under 400 pounds pressure. The light flashed fraction is introduced into the fractionator of the primary viscosity-breaker evaporator and reflux condensate from the latter fractionator, together with reflux condensate produced in fractionating the vapors from the heavy gas oil cracking operation and combined with the straight-run gas oil is subjected to single-pass cracking at a temperature of 975° F. under 400 pounds pressure, the resulting cracked products separated into vapors and residue, the vapors fractionated to separate a gasoline distillate from higher boiling reflux condensate and the latter reflux condensate subjected to recycling cracking at a temperature of 950° F. under 400 pounds pressure.

Although a preferred embodiment of the invention has been described herein, it will be understood that various changes and modifications may be made therein, while securing to a greater or less extent some or all of the benefits of the invention, without departing from the spirit and scope thereof.

I claim:

1. In a combination cracking process the method that comprises distilling crude petroleum to form a residue and a fraction comprising gas oil constituents, passing said residue to a single-pass viscosity-breaking zone wherein the residue is subjected to cracking temperature and superatmospheric pressure under viscosity-breaking conditions to effect conversion into gas oil constituents as well as gasoline constituents, separating the resultant viscosity-broken products into vapors and residue, passing the separated vapors to a fractionating zone wherein the vapors are fractionated to separate lighter fractions from reflux condensate comprising gas oil constituents, passing said residue to a flashing zone wherein it is subjected to flash distillation under reduced pressure to separate vapors from residue, passing the flashed vapors to a separate fractionating zone wherein the vapors are fractionated to separate lighter fractions comprising lighter gas oil constituents from heavy reflux condensate, passing said heavy reflux condensate to a second single-pass cracking zone wherein it is subjected to cracking temperature and superatmospheric pressure under conditions to effect an additional conversion into gas oil constituents as well as gasoline constituents, separating the resultant cracked products from the latter single-pass cracking zone into vapors and residue, fractionating the resultant separated vapors to separate lighter fractions from reflux condensate comprising gas oil constituents, combining resultant gas oil constituents with gas oil constituents produced in said distilling of the crude petroleum and with gas oil constituents formed in said first-mentioned fractionating zone and passing the mixture of gas oil constituents to a third cracking zone wherein it is subjected to cracking temperature and superatmospheric pressure under conditions of high cracking per pass to effect conversion into anti-knock gasoline constituents, and fractionating the resultant cracked products from the third cracking zone to recover a desired gasoline product.

2. In a combination cracking process the method that comprises distilling crude petroleum to form a residue and a fraction comprising gas oil constituents, passing said residue to a single-pass viscosity-breaking zone wherein the residue is subjected to cracking temperature and superatmospheric pressure under viscosity-breaking conditions to effect conversion into gas oil constituents as well as gasoline constituents, separating the resultant viscosity-broken products into vapors and residue, passing the separated vapors to a fractionating zone wherein the vapors are fractionated to separate lighter fractions from reflux condensate comprising gas oil constituents, passing said residue to a flashing zone wherein it is subjected to flash distillation under reduced pressure to separate vapors from residue, passing the flashed vapors to a separate fractionating zone wherein the vapors are fractionated to separate lighter fractions comprising lighter gas oil constituents from heavy reflux condensate, passing said heavy reflux condensate to a second single-pass cracking zone wherein it is subjected to cracking temperature and superatmospheric pressure under conditions to effect an additional conversion into gas oil constituents as well as gasoline constituents, separating the resultant cracked products from the latter single-pass cracking zone into vapors and residue, fractionating the resultant separated vapors to separate lighter fractions from reflux condensate comprising gas oil constituents, combining resultant gas oil constituents with gas oil constituents produced in said distilling of the crude petroleum and with gas oil constituents formed in said first-mentioned fractionating zone as well as with flashed lighter gas oil constituents obtained from the aforesaid separate fractionating zone in which said flashed vapors are fractionated and passing the mixture of gas oil constituents to a third cracking zone wherein it is subjected to cracking temperature and superatmospheric pressure under conditions of high cracking per pass to effect conversion into antiknock gasoline constituents, and fractionating the resultant cracked products from the third cracking zone to recover a desired gasoline product.

3. In a combination cracking process the method that comprises distilling crude petroleum to form a residue and a naphtha fraction, passing said residue through a single-pass cracking zone wherein it is subjected to cracking temperature and superatmospheric pressure under viscosity-breaking conditions to effect conversion into gas oil constituents as well as gasoline, separating the resultant viscosity-broken products into vapors and residue, passing the separated vapors into a fractionating zone wherein the vapors are fractionated to separate lighter fractions from reflux condensate comprising gas oil constituents, passing said residue to a flashing zone wherein the residue is subjected to distillation under reduced pressure, directing said naphtha fraction to a reforming zone wherein the naphtha under superatmospheric pressure is subjected to cracking temperature adequate to effect reformation of gasoline constituents into constituents of increased anti-knock quality, directing the hot products from the reforming zone into said flashing zone to aid in distilling the residue therein, subjecting the flashed vapors to fractionation to separate lighter fractions comprising lighter gas oil constituents from a heavy reflux condensate, passing said heavy reflux condensate to a second single-pass cracking zone wherein it is subjected to cracking temperature under superatmospheric pressure to effect additional conversion into intermediate constituents as well as gasoline constituents, separating the resultant cracked products from said second single-pass cracking zone into vapors and residue, fractionating the resultant separated vapors to separate lighter fractions from reflux condensate comprising gas oil constituents, combining resultant gas oil constituents with gas oil constituents formed in the first-mentioned fractionating zone and passing the mixture of gas oil constituents to a separate cracking zone where it is subjected to cracking temperature and superatmospheric pressure under conditions of high cracking per pass to effect conversion into antiknock gasoline, and fractionating the resultant cracked products from the latter cracking zone to recover a desired gasoline product.

4. In a combination cracking process the method that comprises distilling crude petroleum to form a residue and a naphtha fraction, passing said residue through a single-pass cracking zone wherein it is subjected to cracking temperature and superatmospheric pressure under viscosity-breaking conditions to effect conversion into gas oil constituents as well as gasoline, separating the resultant viscosity-broken products into vapors and residue, passing the separated vapors into a fractionating zone wherein the vapors are fractionated to separate lighter fractions from reflux condensate comprising gas oil constituents, passing said residue to a flashing zone wherein the residue is subjected to distillation under reduced pressure, directing said naphtha fraction to a reforming zone wherein the naphtha under superatmospheric pressure is subjected to cracking temperature adequate to effect reformation of gasoline constituents into constituents of increased anti-knock quality, directing the hot products from the reforming zone into said flashing zone to aid in distilling the residue therein, subjecting the flashed vapors to fractionation in a separate fractionating zone to separate lighter fractions comprising lighter gas oil constituents from a heavy reflux condensate, passing said heavy reflux condensate to a second single-pass cracking zone wherein it is subjected to cracking temperature under superatmospheric pressure to effect additional conversion into intermediate constituents as well as gasoline constituents, separating the resultant cracked products from said second single-pass cracking zone into vapors and residue, fractionating the resultant separated vapors to separate lighter fractions from reflux condensate comprising gas oil constituents, combining resultant gas oil constituents with gas oil constituents formed in the first-mentioned fractionating zone and with flashed lighter gas oil constituents obtained from the aforesaid separate fractionating zone in which said flashed vapors are fractionated and passing the mixture of gas oil constituents to a separate cracking zone wherein it is subjected to cracking temperature and superatmospheric pressure under conditions of high cracking per pass to effect conversion into anti-knock gasoline, and fractionating the resultant cracked products from the latter cracking zone to recover a desired gasoline product.

5. In a combination cracking process the method that comprises distilling crude petroleum to form a residue, a fraction comprising gas oil constituents and a naphtha fraction, passing said residue to a single-pass cracking zone wherein it is subjected to cracking temperature and superatmospheric pressure under viscosity-breaking conditions to effect conversion into gas oil constituents as well as gasoline constituents, separating the resultant viscosity-broken products into vapors and residue, passing the separated vapors into a fractionating zone wherein the vapors are fractionated to separate lighter fractions from a reflux condensate comprising gas oil constituents, passing said residue to a flashing zone wherein the residue is subjected to flash distillation under reduced pressure, directing said naphtha fraction to a reforming zone wherein the naphtha under superatmospheric pressure is subjected to cracking temperature adequate to effect reforming of gasoline constituents into constituents of increased anti-knock quality, directing the resultant reformed products into said flashing zone to aid in the distillation therein, fractionating the flashed vapors to separate lighter fractions comprising lighter gas oil constituents from heavy reflux condensate, directing said heavy reflux condensate to a second single-pass cracking zone wherein it is subjected to cracking conditions of temperature and pressure to effect conversion into gas oil constituents as well as into gasoline constituents, separating the resultant cracked products from said second single-pass cracking zone into vapors and residue, fractionating the resultant separated vapors to separate lighter fractions from reflux condensate comprising gas oil constituents, combining resultant gas oil constituents with gas oil constituents formed in the first-mentioned fractionating zone and with the gas oil constituents obtained in the crude distillation and passing the mixture to a separate cracking zone wherein it is subjected to cracking temperature and superatmospheric pressure under conditions of high cracking per pass to effect conversion into anti-knock gasoline constituents, and fractionating the resultant cracked products to recover a desired gasoline product.

6. In a combination cracking process the method that comprises distilling crude petroleum to form a residue and a fraction comprising gas oil constituents, passing said residue to a single-pass viscosity-breaking zone wherein the residue is subjected to cracking temperature and superatmospheric pressure under viscosity-breaking conditions to effect conversion into gas oil constituents as well as gasoline constituents, separating the resultant viscosity-broken products into vapors and residue, passing the separated vapors to a fractionating zone wherein the vapors are fractionated to separate lighter fractions from reflux condensate comprising gas oil constituents, passing said residue to a flashing zone wherein it is subjected to flash distillation under reduced pressure to separate vapors from residue, passing the flashed vapors to a separate fractionating zone wherein the vapors are fractionated to separate lighter fractions comprising lighter gas oil constituents from heavy reflux condensate, passing said heavy reflux condensate to a second single-pass cracking zone wherein it is subjected to cracking temperature and superatmospheric pressure under conditions to effect an additional conversion into gas oil constituents as well as gasoline constituents, separating the resultant cracked products from the latter single-pass cracking zone into vapors and residue, fractionating the resultant separated vapors to separate lighter fractions from reflux condensate comprising gas oil constituents, combining resultant gas oil constituents with gas oil constituents produced in said distilling of the crude petroleum and with gas oil constituents formed in said first-mentioned fractionating zone and passing the mixture to a third single-pass cracking zone wherein it is subjected to cracking temperature and superatmospheric pressure under conditions of high cracking per pass to effect conversion into anti-knock gasoline constituents, separating the resultant cracked products from said third single-pass cracking zone into vapors and residue and passing the separated vapors to a separate fractionating zone wherein the vapors are fractionated to separate a desired distillate from higher boiling reflux condensate, directing said higher boiling reflux condensate to a recycling cracking zone wherein it is subjected to cracking conditions of temperature and pressure to effect conversion into lower boiling products, separating the resultant cracked products from said recycling cracking zone and passing the separated vapors to the latter separate fractionating zone.

7. In a combination cracking process the method that comprises distilling crude petroleum to form a residue, a fraction comprising gas oil constituents and a naphtha fraction, passing said residue to a single-pass cracking zone wherein it is subjected to cracking temperature and superatmospheric pressure under viscosity-breaking conditions to effect conversion into gas oil constituents as well as gasoline constituents, separating the resultant viscosity-broken products into vapors and residue, passing the separated vapors into a fractionating zone wherein the vapors are fractionated to separate lighter fractions from a reflux condensate comprising gas oil constituents, passing said residue to a flashing zone wherein the residue is subjected to flash distillation under reduced pressure, directing said naphtha fraction to a reforming zone wherein the naphtha under superatmospheric pressure is subjected to cracking temperature adequate to effect reforming of gasoline constituents into constituents of increased anti-knock quality, directing the resultant reformed products into said flashing zone to aid in the distillation therein, fractionating the flashed vapors to separate lighter fractions comprising lighter gas oil constituents from heavy reflux condensate, directing said heavy reflux condensate to a second single-pass cracking zone wherein it is subjected to cracking conditions of temperature and pressure to effect conversion into gas oil constituents as well as into gasoline constituents, separating the resultant cracked products from said second single-pass cracking zone into vapors and residue, fractionating the resultant separated vapors to separate lighter fractions from reflux condensate comprising gas oil constituents, combining resultant gas oil constituents with gas oil constituents produced in said distilling of the crude petroleum and with gas oil constituents formed in said first-mentioned fractionating zone and passing the mixture to a third single-pass cracking zone wherein it is subjected to cracking temperature and superatmospheric pressure under conditions of high cracking per pass to effect conversion into anti-knock gasoline constituents, separating the resultant cracked products from said third single-pass cracking zone into vapors and residue and passing the separated vapors to a separate fractionating zone wherein the vapors are fractionated to separate a desired distillate from higher boiling reflux condensate, directing said higher boiling reflux condensate to a recycling cracking zone wherein it is subjected to cracking conditions of temperature and pressure to effect conversion into lower boiling products, separating the resultant cracked products from said recycling cracking zone and passing the separated vapors to the latter separate fractionating zone.

EDWARD D. PHINNEY.